(12) United States Patent
Stith, Jr.

(10) Patent No.: US 9,568,384 B1
(45) Date of Patent: Feb. 14, 2017

(54) VARIABLE VOLUME ENCLOSURE TO TERMINATE VENTED PRESSURE TRANSDUCERS

(71) Applicant: Remote Industrial Sensor Company LLC, Cincinnati, OH (US)

(72) Inventor: Ken N. Stith, Jr., Cincinnati, OH (US)

(73) Assignee: Remote Industrial Sensor Company LLC, Cincinnati, OH (US)

( * ) Notice: Subject to any disclaimer, the term of this patent is extended or adjusted under 35 U.S.C. 154(b) by 169 days.

(21) Appl. No.: 14/528,666

(22) Filed: Oct. 30, 2014

Related U.S. Application Data

(60) Provisional application No. 61/897,548, filed on Oct. 30, 2013.

(51) Int. Cl.
| | |
|---|---|
| *G01L 19/06* | (2006.01) |
| *G01L 19/14* | (2006.01) |
| *G01L 7/06* | (2006.01) |
| *G01D 11/24* | (2006.01) |

(52) U.S. Cl.
CPC .............. *G01L 7/06* (2013.01); *G01D 11/245* (2013.01)

(58) Field of Classification Search
CPC ... G01L 19/141; G01L 19/142; G01L 19/0038
See application file for complete search history.

(56) References Cited

U.S. PATENT DOCUMENTS

| | | | | |
|---|---|---|---|---|
| 2003/0115965 | A1* | 6/2003 | Mittelstein ............ | G01L 9/0064 73/706 |
| 2011/0167993 | A1* | 7/2011 | Lan ....................... | G01L 19/142 84/744 |
| 2013/0019687 | A1* | 1/2013 | Wosnitza ............ | G01L 19/0654 73/700 |
| 2013/0125647 | A1* | 5/2013 | Lopatin .............. | B01J 20/28026 73/431 |
| 2013/0340532 | A1* | 12/2013 | Wohlgemuth .......... | G01L 19/06 73/716 |
| 2016/0025585 | A1* | 1/2016 | Dammen ............ | G01L 19/0645 73/146.3 |

\* cited by examiner

*Primary Examiner* — Daniel J Colilla
*Assistant Examiner* — Ruben Parco, Jr.
(74) *Attorney, Agent, or Firm* — Wood Herron & Evans LLP

(57) ABSTRACT

Measurements of pressure relative to atmospheric reference pressure are enabled by a sealed enclosure, which in one aspect is a variable volume enclosure including a movable element responsive to atmospheric pressure, to at least partially equalize pressure internal to the variable volume enclosure to the pressure external to the variable volume enclosure, such that a pressure sensor pneumatically connected to the internal volume can use its pressure a reference in measuring atmospheric pressure. The variable volume enclosure may house electronics and/or electrical terminations for pressure sensing, or the variable volume enclosure may be a sub-enclosure connected pneumatically to the pressure sensor, with another enclosure housing electronics or electrical terminations. In another embodiment, the sealed enclosure includes an absolute pressure sensor for sensing atmospheric pressure for use as a reference, and need not have variable volume.

6 Claims, 6 Drawing Sheets

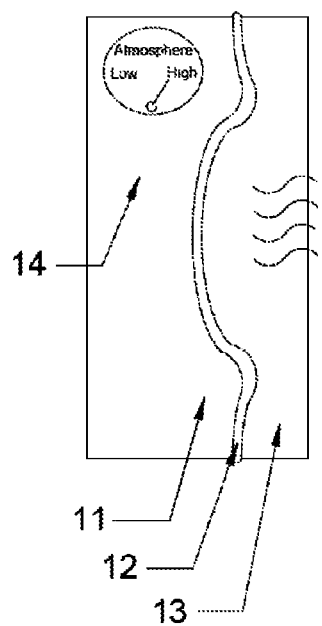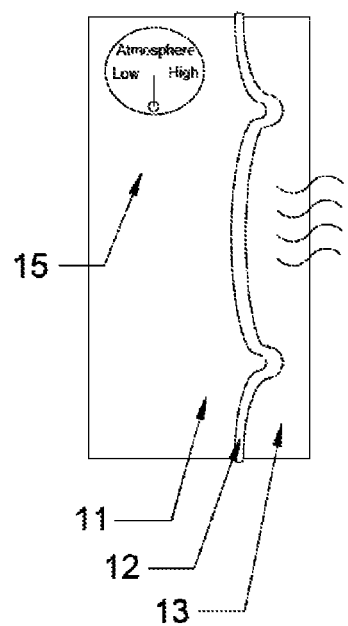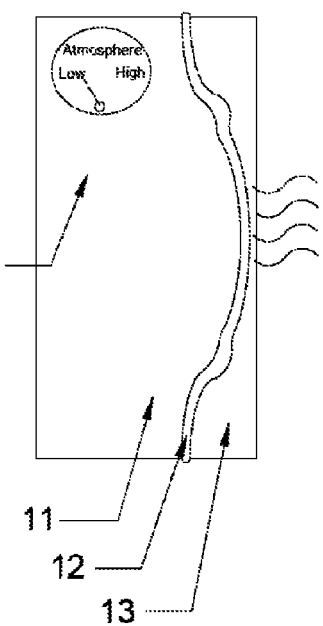

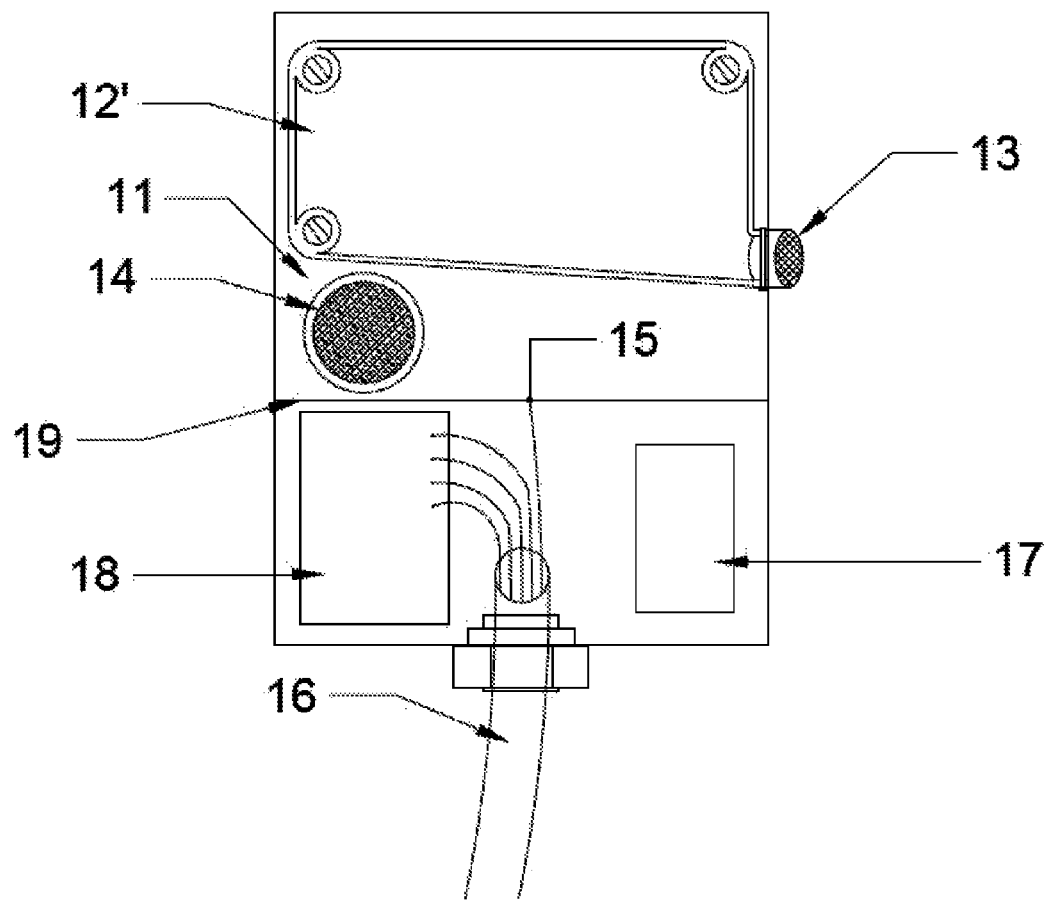

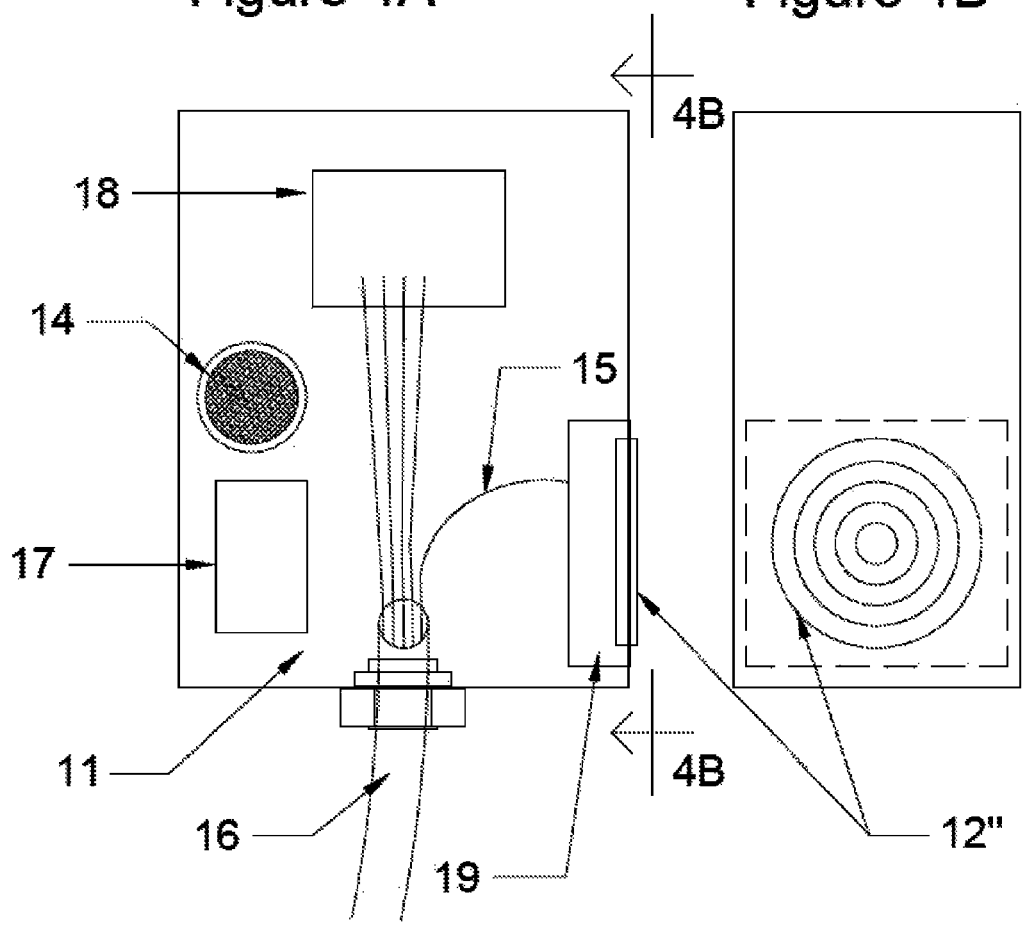

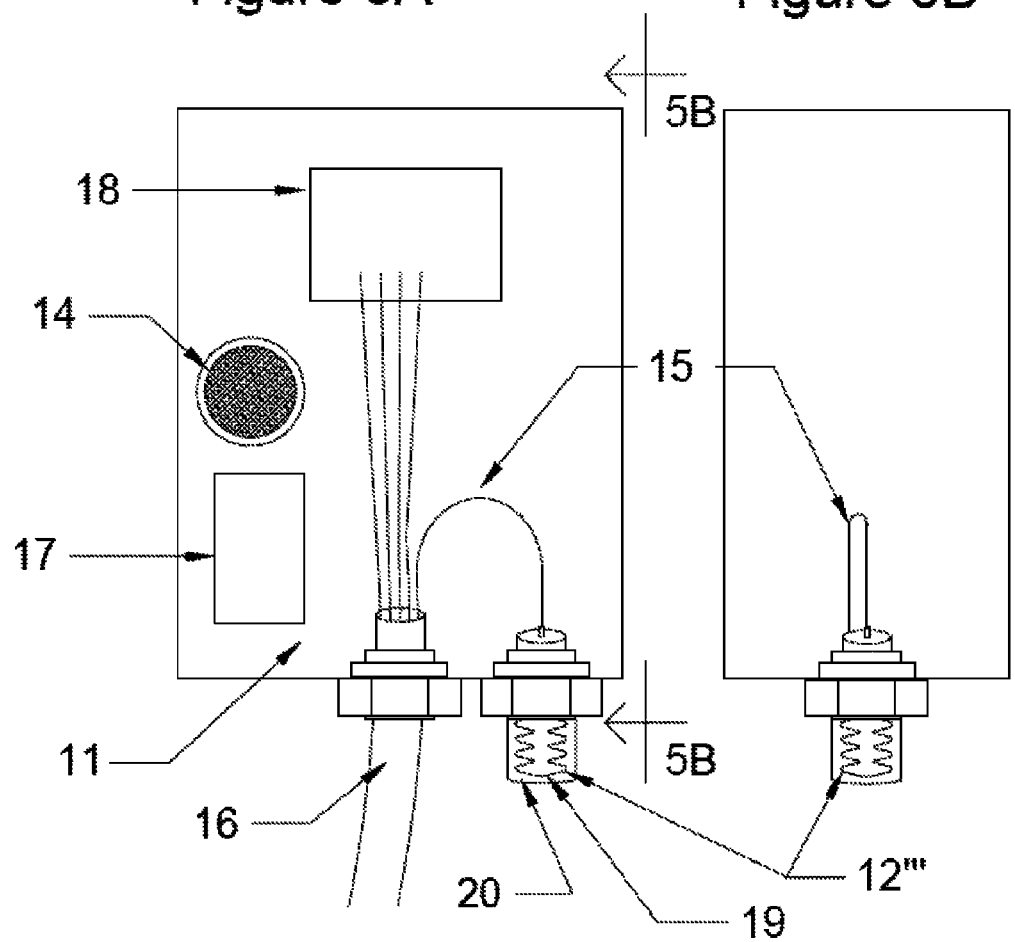

VARIABLE VOLUME ENCLOSURE TO TERMINATE VENTED PRESSURE TRANSDUCERS

The present invention claims priority to U.S. Provisional Application Ser. No. 61/897,548 filed Oct. 30, 2013, entitled WIRELESS PRESSURE SENSING SYSTEM, which is incorporated herein in its entirety.

FIELD OF THE INVENTION

The present invention relates to pressure transducers used to measure pressure relative to atmospheric pressure at a location that is moist or otherwise detrimental to the use of electronics.

BACKGROUND OF THE INVENTION

Many applications require the measurement of pressure at a remote location, but some of these applications are more difficult to implement due to atmospheric conditions where the measurement is made. For example, pressure measurements are needed in sewers to control and manage water and sewage flow, but the environment in the sewer is moist and damaging to electronics, as well as potentially explosive. Although the pressure measuring electronics can be placed inside a housing, in order to measure pressure relative to atmospheric pressure, it has been necessary to include a vent to atmosphere to permit detection of atmospheric pressure in order to make the measurement, which means that moisture from the surrounding atmosphere can enter the housing and damage the electronics, as well as posing a threat of ignition of explosive gasses in the environment.

In the prior art, electronics for a pressure sensor have been positioned within a housing, and a vent tube has been pneumatically connected from the pressure sensor to the housing, to carry atmospheric pressure to the pressure transducer so that measured pressures may be referenced to atmospheric pressure. In this approach, to control moisture, a desiccant has typically been installed at the housing end of the pressure transducer's vent tube, to absorb moisture and prevent moisture from entering the vent tube. While this solution addresses the infiltration of moisture, it requires regular replacement of the desiccant when its moisture absorbing capacity is diminished. Furthermore, because the vent tube carries pressure from inside the housing to the sensor, if the housing is sealed, the housing pressure, not atmospheric pressure, is delivered to the sensor, causing inaccuracy. If, however, the housing is unsealed to allow its internal pressure to equalize with atmosphere, the venting exposes electronics and electrical connections in the housing to outside atmosphere, which can present problems to the electronics in an environment containing moisture, and more severe problems when the environment contains other more corrosive gasses. Furthermore, if flammable gasses can infiltrate the housing the electronics can pose a risk of igniting those gasses.

In other prior art, a pressure transducers for sensing external air pressure have been mounted in a bellows or bladder inside of a generally unsealed electrical control housing. While this solution isolates the pressure transducer from moisture, it does not prevent the infiltration of moisture to other electronic components, nor does it address the problems inherent with atmospheric exposure of electronics and electrical connections in potentially explosive or corrosive environments.

SUMMARY OF THE INVENTION

In a first aspect, the present invention features an apparatus for measuring pressure relative to an atmospheric reference pressure, comprising a sealed enclosure enclosing at least one of pressure sensing electronics and electrical terminations for pressure sensing, in which the enclosure is of variable volume and includes a movable element responsive to atmospheric pressure to at least partially equalize pressure internal to the variable volume enclosure to the pressure external to the variable volume enclosure. The enclosure is pneumatically coupled to a pressure sensor such that the pressure within the sealed enclosure may be used by the pressure sensor as a reference in measuring atmospheric pressure.

In one embodiment, the movable element passively moves in response to variation of atmospheric pressure to adapt the volume of the sealed enclosure to at least partially equalize the pressure internal to the variable volume enclosure to that external to the variable volume enclosure. The passively moving moveable element may comprise a bellows fitted in a wall of the sealed enclosure, or a diaphragm forming at least part of a wall of the sealed enclosure.

In further embodiments, the sealed variable volume enclosure may comprise a sub-enclosure appended to an electronics enclosure, the electronics enclosure incorporating pressure sensing electronics and/or electrical terminations therefor. In this embodiment, the electronics enclosure may itself be sealed and of a fixed volume, and the sub-enclosure may form part of the electronics enclosure, or an appendage of the electronics enclosure, or be separated from the electronics enclosure and connected electrically to the electronics in the electronics enclosure. The sub-enclosure can comprise a moving element like that in the first embodiment, which passively moves in response to variation in atmospheric pressure, which may comprise a bellows or a diaphragm forming at least part of a wall of the sub-enclosure. Pneumatic connection to the sub-enclosure permits a pressure sensor to measure atmospheric pressure as a reference.

In further embodiments, the sealed enclosure may incorporate a dessicant for capturing moisture within the enclosure.

In a second aspect the invention features a sealed enclosure for a pressure transducer for measuring pressure relative to a reference atmospheric pressure, incorporating in a wall thereof an absolute pressure sensor for measuring atmospheric pressure, the sealed enclosure enclosing at least one of pressure sensing electronics and electrical terminations for pressure sensing, and integrating in a wall of the sealed enclosure the absolute pressure sensor with the pressure sensitive surfaces of the absolute pressure sensor exposed to the atmosphere surrounding the sealed enclosure.

The above and other objects and advantages of the present invention shall be made apparent from the accompanying drawings and the description thereof.

BRIEF DESCRIPTION OF THE DRAWINGS

FIGS. 2A, 2B and 2C illustrate the movement of the flexible diaphragm in response to atmospheric pressure to create equalized pressure between the interior of the sealed enclosure and the exterior atmosphere;

FIG. 3 is a plan view of an alternative embodiment of a variable volume sealed enclosure for pressure measurement in accordance with principles of the present invention, which incorporates an internal flexible bladder that allows the pressure to equalize between the sealed enclosure's interior and the exterior atmosphere;

FIGS. 4A and 4B are views of another alternative embodiment of a variable volume sealed enclosure for pressure measurement in accordance with principles of the present invention, which incorporates a sub-enclosure for an atmospheric pressure sensor, the sub-enclosure being a sealed portion of the main enclosure that incorporates a flexible diaphragm that allows the pressure to equalize between the interior of the sub-enclosure and the exterior atmosphere;

FIGS. 5A and 5B are views of yet another alternative embodiment of a variable volume sealed enclosure for pressure measurement in accordance with principles of the present invention, which incorporates a sub-enclosure for an atmospheric pressure sensor, the sub-enclosure being a flexible bellows that allows the pressure to equalize between the interior of the sub-enclosure and the exterior atmosphere.

Figure 1A:
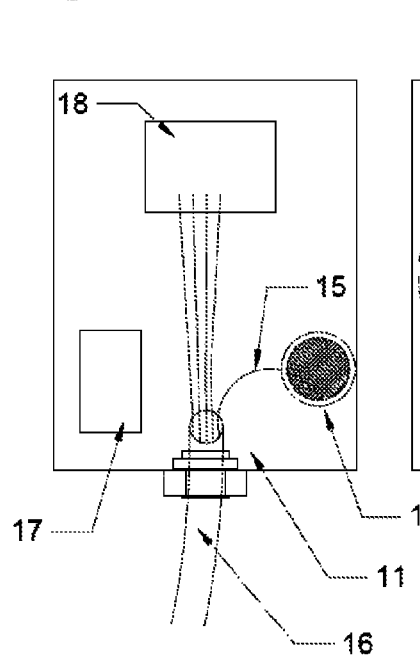
FIGS. 1A, 1B and 1C are views of a variable volume sealed enclosure for pressure measurement in accordance with principles of the present invention, which incorporates an integrated flexible diaphragm and lid seal that allows the pressure to equalize between the interior of a sealed enclosure and the exterior atmosphere.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

In accordance with a first aspect of the present invention, a pressure measurement relative to atmospheric pressure is enabled, while avoiding exposure of measuring electronics to moisture or other environmental conditions, by providing a variable volume enclosure which incorporates a bladder, bellows, diaphragm, flexible wall(s) or similar movable element to allow the outside atmospheric pressure to passively translate and vary the enclosure's volume such that the enclosure's resulting internal pressure varies in response to the external atmospheric pressure, and reflects that external pressure plus or minus the force required to vary the volume.

The volume of the enclosure's unoccupied space (along with the volume of any atmospheric pressure sensing transducer, and any vent tube pneumatically connected to that sensor), must be varied so that the entire volume can be brought to an approximate atmospheric pressure. Given the ideal gas law $PV=nRT$, solving for P gives the proportional inverse relationship of Pressure and Volume. That is, as the volume inside the compensated portion is decreased the resulting pressure is higher and vice versa. As a consequence, the minimum required variation in volume that the enclosure must support, is directly proportional to the total compensated volume, and the proportional change required is a function of the atmospheric pressure change that must be compensated. Although the variable volume means needs to compensate for a range of atmospheric pressure, it does not have to cover the full gamut of atmospheric pressures found throughout the surface of the earth. The variable volume means only needs to compensate for the local atmospheric pressure variation at the installation site. As an example, assume that the local atmospheric pressure changes by 10% (e.g., between 28 and 32 inches Hg) then the total compensated volume will need to be capable of varying the total compensated volume by 10% as well.

The measured pressure inside of the sealed housing will not entirely reflect the atmospheric pressure, but instead, will vary plus or minus from atmospheric pressure as a consequence of the force required to move the movable element. This variation will, however, be roughly proportional to the variation of atmospheric pressure from the nominal pressure value inside the sealed enclosure when the movable element is at rest (the nominal pressure value being equal to the atmospheric pressure at the moment the enclosure was sealed). Thus, the variation of the internal pressure from atmospheric pressure could be computed based upon the difference of the internal pressure from the nominal pressure, and the variation thereby compensated. However, in many situations such compensation may not be needed, as the slight inaccuracy of the internal pressure of the housing from atmospheric pressure may be acceptable for the desired measurement.

The prior art has issues when applied to situations where the pressure transducer is terminated within the remote location such that the environment is harsh, high humidity, potentially explosive or any combination thereof. Enclosing the electronics and venting the vented pressure transducer inside a sealed enclosure prevents contamination getting to the electronics and the vent tube. Additional benefits over the prior art include not having to replace the desiccant on a periodic bases.

Now deriving the volume variation in more detail, given the Ideal Gas Law—$PV=nRT$ where P is the pressure of the gas in the enclosure; V is the volume of the enclosure; n is the number of moles in the enclosure; R is the universal gas constant; and T is the temperature of the gas in the enclosure.

| Where: | |
| --- | --- |
| Initial state 1: | $P_1V_1 = n_1RT_1$ |
| Changed state 2: | $P_2V_2 = n_2RT_2$ |
| Assume: | |
| $n_1 = n_2$ and $T_1 = T_2$ | |
| Therefore; | |
| $P_2V_2 = P_1V_1$ | |

Figure 1B:
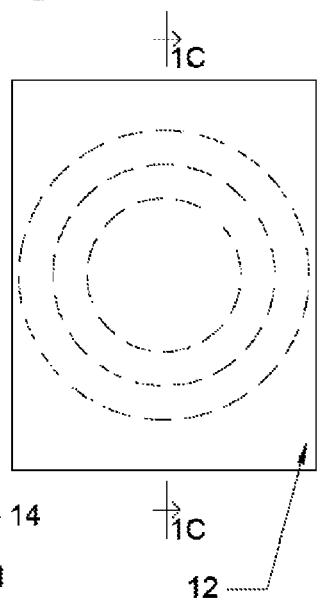
Figure 1C:
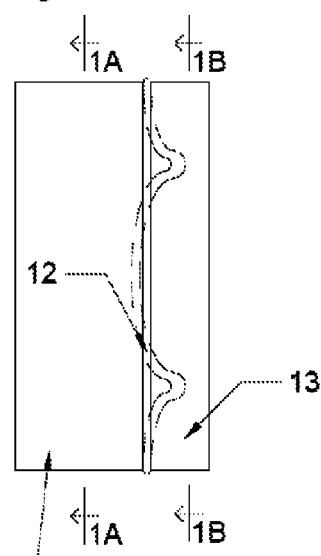

Turning now to the drawings, FIGS. 1A-1C illustrate various views of a variable volume enclosure (11) in accordance with principles of the present invention. The enclosure houses electronics (18), e.g. a wireless transmitter for capturing and transmitting pressure measurements, and a battery (17) for supplying power to the electronics. The electronics (18) are coupled via a sealed cable (16) to a remote pressure sensor, which is positioned in the environment where pressure measurement is desired. The enclosure further incorporates a flexible diaphragm (12) and seal between the enclosure and a vented lid (13). The flexible diaphragm (12) is a moveable element, and can move between the sealed portion of the variable volume enclosure (11) and the vented lid (13) to establish an approximately neutral pressure differential between the sealed enclosure (11) and the surrounding atmosphere. Because the enclosure (11) is sealed, moisture, explosive gasses or other atmospheric contaminants are generally prevented from reaching the electronics (18). A venting tube (15) from the pressure sensor can thus be connected to the internal volume of the enclosure to detect a reference, near atmospheric pressure. Additionally, an optional desiccant (14) can be installed inside the sealed housing to absorb any moisture that may enter the enclosure (11) over extended periods of time. It is expected that, given the sealed nature of the enclosure, the desiccant will not requirement replacement any more often than the battery (17). The vent tube (15) extending from the pressure transducer through the sensor cable (16) can be pneumatically connected via the desiccant (14) to offer immediate protection when the enclosure (11) is opened for battery (17) replacement.

Given a sealed enclosure with stable temperature and number of moles of gas, it can be derived from the Ideal Gas Law that the Pressure and Volume inside the sealed enclosure has a direct inverse proportional relationship. FIG. 2A-2C illustrate the manner in which a moveable element of a sealed variable volume enclosure (11) in accordance with principles of the present invention will change volume to permit the pressure inside the enclosure to match the surrounding atmospheric pressure. When the atmospheric pressure is high, as shown in FIG. 2A, the volume of the sealed enclosure 11 is allowed to shrink to a small volume (14) in order to equalize the internal pressure to that of the atmosphere minus a small amount of pressure loss required to move and maintain the flexible diaphragm (12) in position. As the atmospheric pressure changes from high to moderate, as seen in FIG. 2B, the sealed variable volume enclosure (11) changes its volume again to a moderate volume (15) to equalize the pressure outside to that of the atmosphere minus a small amount of pressure loss required to move and maintain the flexible diaphragm (12) in position. As seen in FIG. 2C, when the atmospheric pressure is low, the volume of the enclosure (11) is allowed to expand to a large volume (16), in order to equalize the internal pressure to that of the atmosphere minus a small amount of pressure loss required to move and maintain the flexible diaphragm (12) in position.

FIG. 3 is an example of an alternative embodiment of a variable volume enclosure (11) using a moveable element in the form of a flexible internal bladder (12'), configured with external air pressure on the inside of the bladder (the inside of the bladder being vented to atmosphere via vent 13). The protected internal pressure compensated environment of the enclosure (11) on the outside of the bladder. FIG. 3 also shows that the enclosure (11) includes an internal divider (19) to separating the enclosure into two sub-enclosures, the first housing the bladder 12' and the second housing the electronics (18) and battery (17). The sensor cable (16) connects to the lower sub-housing but the vent tube (15) from the sensor cable extends to and pneumatically connects to the upper sub-enclosure which, as noted, is substantially equilibrated to atmospheric pressure. Division of the enclosure into two sub-enclosures permits the reduction of the size of the pressure compensated volume to only the sub-enclosure containing the bladder 12', thus reducing the amount of volume change required to be provided by bladder 12'. An optional desiccant (14) can be installed in the pressure compensated sub-enclosure, to absorb any moisture that may enter the enclosure (11) over extended periods of time. The pressure transducer's vent tube (15) can be pneumatically connected to the sub-enclosure via the desiccant (14) to offer immediate protection from moisture whenever the enclosure (11) is opened.

FIGS. 4A and 4B illustrate yet another embodiment of principles of the present invention utilizing a sub-enclosure. In this embodiment the enclosure (11) houses electronics (18) and battery (17) and includes a sub-enclosure (19) which incorporates a flexible diaphragm (12"). The flexible diaphragm (12") can move between the variable volume sub-enclosure (19) and open atmosphere to establish a neutral pressure in the sub-enclosure (19) to be used as an atmospheric reference for the pressure transducer. The pressure transducer's vent tube (15) is pneumatically connected to the variable volume sub-enclosure (19), directly or first through a desiccant (14) that will absorb moisture that may enter over an extended period of time.

FIGS. 5A and 5B illustrate of another embodiment of principles of the present invention applied to a sealed enclosure (11) which houses electronics (18) and a battery (17) for pressure sensing. Here, a variable volume sub-enclosure (19) is created by the use of a flexible bellows (12''') appended to the sealed enclosure (11), and the pressure transducer's vent tube (15) is pneumatically connected directly to the variable volume sub-enclosure (19), or it may be connected thereto through a desiccant (14), to provide an atmospheric pressure reference. The variable volume sub-enclosure (19) formed by the flexible bellow (12''') may be mounted anywhere, including remotely from the sealed enclosure (11) and pneumatically connected via a connecting tube, or projecting outwardly from the wall of the sealed enclosure (11) as shown in FIGS. 5A and 5B, or projecting inwardly from the wall of the sealed enclosure, or completely inside the sealed enclosure (11) and pneumatically connected to outside atmosphere by a connecting tube.

Figures 6A, 6B:
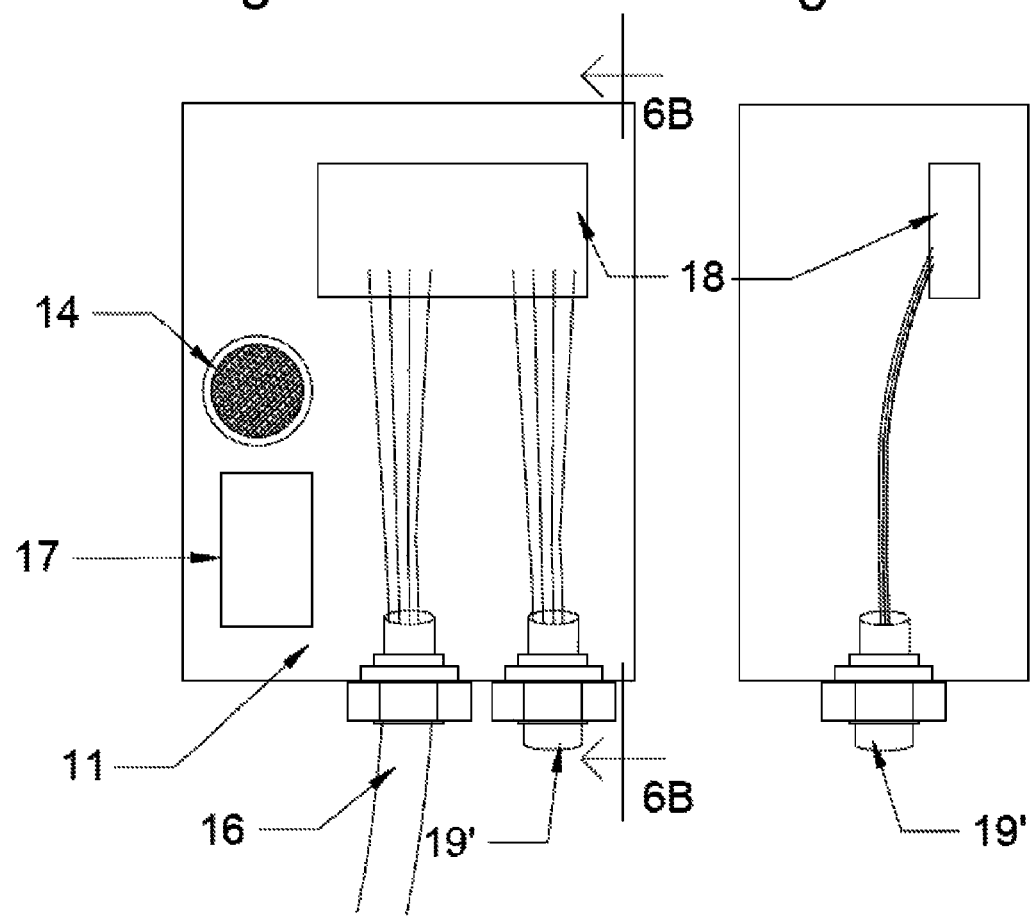
FIGS. 6A and 6B illustrate yet another alternative embodiment of pressure measurement in accordance with principles of the present invention, comprising an electronic absolute pressure sensor for atmospheric pressure reference mounted externally to the sealed housing.

FIG. 6 is an illustration of another embodiment of principles of the present invention, where a sealed enclosure (11) housing electronics (18) and a battery (17) uses an electronic absolute pressure sensor (19') connected through the wall of the sealed enclosure to provide an electrical atmospheric pressure reference measurement, that can be electronically subtracted from the primary electronic absolute pressure transducer measurement obtained from the sensor coupled to cable (16), to create an pressure measurement relative to atmosphere, without requiring venting of the pressure sensor coupled to the cable (16).

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. Apparatus for measuring pressure relative to an atmospheric reference pressure, comprising:
   a pressure sensor; and
   a sealed variable volume enclosure enclosing at least one of pressure sensing electronics and electrical terminations for pressure sensing electronics connected to the pressure sensor, the sealed variable volume enclosure having a volume defined by walls and a movable element included in the walls, the movable element permitting variation of the volume of the sealed variable volume enclosure in response to atmospheric pressure to at least partially equalize an internal pressure of the sealed variable volume enclosure to the atmospheric pressure external to the sealed variable volume enclosure, whereby the pressure sensor uses the internal pressure within the sealed variable volume enclosure as a reference to measure pressures relative to the atmospheric pressure, wherein the sealed variable volume enclosure is connected to the pressure sensor via the electrical terminations and a vent tube, and the vent tube is pneumatically connected to the volume of the sealed variable volume enclosure.

2. The apparatus of claim 1 wherein the movable element passively moves in response to variation of the atmospheric pressure to thereby change the volume of the sealed variable volume enclosure to at least partially equalize the internal pressure of the sealed enclosure to the atmospheric pressure external to the sealed variable volume enclosure.

3. The apparatus of claim 2 wherein the moveable element comprises a bellows forming at least part of the walls of the sealed variable volume enclosure.

4. The apparatus of claim 2 wherein the moveable element comprises a diaphragm forming at least part of a wall of the sealed variable volume enclosure.

5. The apparatus of claim 1 further comprising a desiccant in the sealed variable volume enclosure for capturing moisture within the sealed variable volume enclosure.

6. The apparatus of claim 1 wherein the vent tube is pneumatically connected to the volume of the sealed variable volume enclosure via a desiccant.

* * * * *